May 17, 1966  H. ELLENBERGER  3,251,262
STABILIZED OPTICAL LEVELING INSTRUMENT
WITH SPRING MOUNTED OPTICAL ELEMENT
Filed May 2, 1961  3 Sheets-Sheet 1

Inventor
Heinrich Ellenberger
By
Michael S. Striker
Attorney

May 17, 1966 H. ELLENBERGER 3,251,262
STABILIZED OPTICAL LEVELING INSTRUMENT
WITH SPRING MOUNTED OPTICAL ELEMENT
Filed May 2, 1961 3 Sheets-Sheet 2

Inventor
Heinrich Ellenberger
By Michael S. Striker
Attorney

United States Patent Office 3,251,262
Patented May 17, 1966

3,251,262
STABILIZED OPTICAL LEVELING INSTRUMENT WITH SPRING MOUNTED OPTICAL ELEMENT
Heinrich Ellenberger, Otilostrasse 23,
Munich-Pasing, Germany
Filed May 2, 1961, Ser. No. 107,098
Claims priority, application Germany, Nov. 24, 1954,
E 9,878
5 Claims. (Cl. 88—1)

The present invention relates to optical instruments and more particularly to an optical leveling instrument with means for automatically adjusting the viewing direction thereof.

The present invention is a continuation in part application of the co-pending application, filed November 25, 1955, and having the Serial No. 549,135, now abandoned.

Optical leveling instruments including an optical element mounted on the instrument so that the position thereof will be automatically adjusted by gravitational forces for maintaining the viewing direction of the instrument are known in the art. Such an instrument may be adjusted to a horizontal position roughly by hand while the fine adjustment of the viewing direction of the instrument will be automatically performed by the forementioned optical element.

The present invention relates especially to means for mounting the optical element which is used for automatically adjusting the viewing direction of the instrument. It is an object of the present invention to provide an optical leveling instrument with a means for automatically adjusting the viewing direction which is mounted in a substantially friction free manner.

A further object of the present invention is to provide an optical leveling instrument with a viewing direction adjusting means which is influenced only to a very small extent by jarring of the instrument or other shocks.

An additional object of the present invention is to provide an optical leveling instrument with a viewing direction adjusting and stabilizing means which is inexpensive to manufacture, but nevertheless extremely accurate, and which can be adjusted in a simple manner to any desired sensitivity and other properties.

With the above objects in view the present invention mainly consists of an optical leveling instrument which includes support means, a pair of optically aligned lens means mounted spaced from each other on the support means, optical means located between said lens means for adjusting the viewing direction of the instrument, and spring means carrried by and projecting from the support means for supporting the optical means in such a manner that during change of the inclination of the support means through a given angle said spring means will bend so as to change the inclination of said optical means through an angle different from said given angle so as to maintain the viewing direction of the instrument substantially unchanged during tilting of the support means.

The weight of the optical means, the position of the center of gravity thereof relative to the point of attachment of the spring means, the bending resistance of the spring means and the position of the optical means relative to the optically aligned lens means are adjusted with respect to each other in such a manner so as to satisfy the requirement to maintain the viewing direction of the instrument substantially unchanged during tilting of the support means and also to adjust the viewing direction of the instrument to an exact horizontal position when the instrument is only roughly adjusted and the support or instrument body is not in an exact horizontal position.

The instrument of the present invention preferably comprises further means for limiting the bending of the spring means during excessive tilting of the support means so that even during unproper handling of the instrument or during jarring of the instrument, excessive strains on the spring means are avoided so that elastic after effects (hysteresis) are held within narrow limits.

Preferably the spring means is mounted on the support means in such a manner and the center of gravity of the optical means carried by the spring means is arranged with respect to the attached end of the spring means in such a manner that the spring means is subjected during the normal working range of the instrument only to bending moments which tend to bend the spring means in one direction, that is that the spring means are bent only in one direction out of a position of rest the spring means would assume when not stressed, so that the spring means during the bending thereof will not pass through this position of rest. It is pointed out that the bending of a flat leaf spring through the position of rest, that is from a concave form to a convex form proceeds in an unstable manner especially if the leaf spring is not perfectly flat and the exactness of the instrument is therefore improved when the spring and the optical element carried thereby are arranged in such a manner that during the normal working range of the instrument the spring is bent only in one direction from its position of rest. The above mentioned limiting means can also be arranged in such a manner that the spring can bend only in one direction from its position of rest.

The spring means are preferably made in the form of a leaf spring, but rod shaped spring means of circular or other cross section may also be used. Means are also preferably provided for adjusting the position of the center of gravity of the optical means or for adjustment of the sensitivity of the arrangement and such means are preferably in the form of one or two adjustable screws carried by or operatively connected to the optical means. It may also be advantageous to provide the optical means with damping means so that it will rapidly arrive at a position of rest after deflection.

The optical means can be in the form of a prism, a mirror, a plate with plano-parallel surfaces, a reticle, a lens, a combination of the forementioned elements or a plurality of any of the forementioned elements. The optical adjusting means may be mounted at any location in the path of the light rays passing through the optical instrument between the objective and the ocular thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
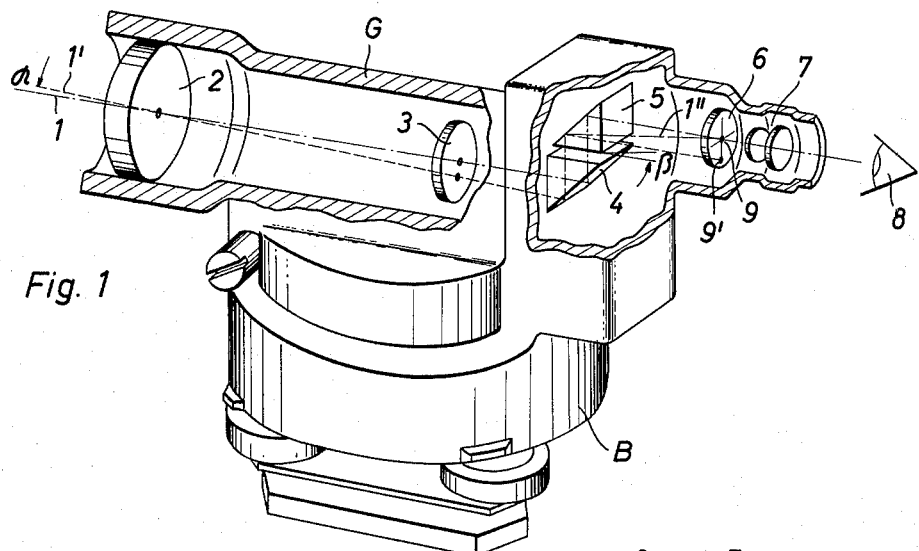
FIG. 1 is a partially sectioned perspective view of a leveling instrument of the present invention and showing the general arrangement thereof.

FIGURE 1 shows the general arrangement of an instrument according to the present invention. As can be seen from FIGURE 1 the instrument comprises a housing G, partly broken away in FIGURE 1 to show the arrangement of the optical elements therein. The instrument housing or support G is mounted on a base B, the inclination thereof can be adjusted in a well known manner by adjusting screws as schematically indicated in FIGURE 1. The instrument in the general form of a telescope comprises an objective 2, a focusing lens 3, two prisms 4 and 5, a reticle 6 and an ocular 7, all mounted in the housing G optically aligned with each other. The focusing lens 3 is arranged movably in the housing G along the optical axis of the instrument, as indicated by the arrow to focus the image of an object viewed by the eye 8 of an observer in the plane of the reticle 6 so that proper focusing may be obtained without changing the distance between objective 2 and ocular 7. The adjustment of the position of the focusing lens 3 can be made in any well known manner and the adjusting mechanism for the focusing lens 3 does not form part of the present invention.

Figure 1A:
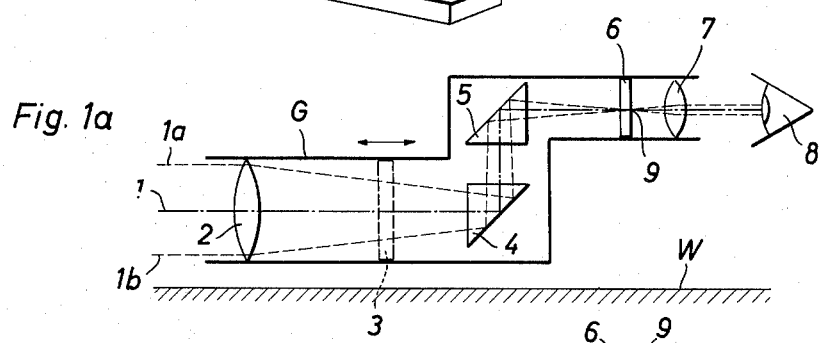
FIGS. 1a to 1c are schematic side views of the arrangement shown in FIGURE 1 illustrating the path of the light rays through the instrument during tilting of the latter.
Figure 1B:
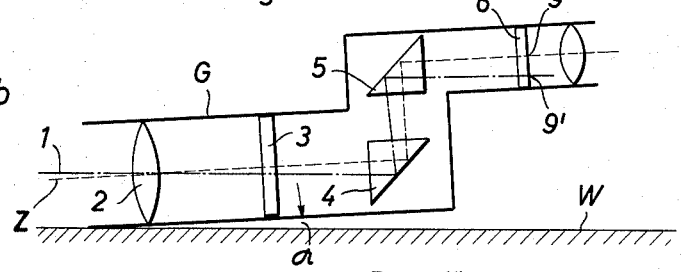
Figure 1C:
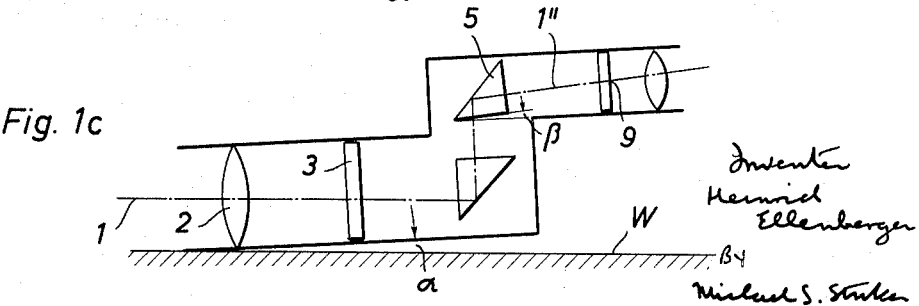

FIGURES 1a–1c illustrate schematically the path of the light rays through the instrument illustrated in FIGURE 1. When the instrument is adjusted in exact horizontal position as shown in FIGURE 1a in which the optical axis or the instrument housing G is parallel to a horizontal line W, then the light rays emanating from an object which is at the same height as the center of the objective 2 will enter the instrument parallel to the optical axis thereof. The light rays are illustrated in FIGURE 1a by the central ray 1 and the border rays 1a and 1b, whereas in FIGURES 1b and 1c only the center light ray is illustrated. By adjusting the lens 3 the light rays will be focused in the plane of the reticle 6 so that the image of an infinite distant point will appear in the center 9 of the reticle 6, and this image will be seen by the eye 8 of the observer through the ocular 7.

When the instrument body G is now slightly tilted with respect to the horizontal line W through a small angle $\alpha$, as shown in FIGURE 1b, the line of sight or viewing direction is likewise tilted and in the center 9 of the reticle 6 appears a point which is located below the horizontal plane passing through the center of the objective 2. The image of the point, appearing in the position of the instrument shown in FIGURE 1a in the center 9 of the reticle 6, appears in the tilted position of the instrument shown in FIGURE 1b at the point 9' of the reticle. It is pointed out that the image is reversed in the telescope so that the light ray 1 which emanates from a point which is in the tilted position of the instrument as shown in FIGURE 1b above the viewing direction will appear at the reticle 6 below the center 9 thereof. In this position the instrument would therefore be improperly levelled so that errors in the measurements obtained would result.

These errors in the measurement during tilting of the instrument body G through small angles can be corrected when an optical element of the instrument is moved or turned in such a manner that the image of a ray emanating from a point at the same elevation as the center of the objective 2 will appear again exactly at the center 9 of the reticle 6. To obtain this correction of the measuring error it is necessary to tilt the prism 5 through an angle $\beta$ in the direction of the arrow shown in FIGURE 1c. The part 1'' of the ray 1 is then deflected by the prism 5 in such a manner that it will pass again through the center 9 of the reticle 6. The viewing direction of the instrument is thereby adjusted to horizontal position despite the slight tilting of the instrument body and any errors in the measurement are thereby corrected. The necessary tilting of the optical adjusting means, the prism 5 shown in FIGURES 1 and 1a–1c, is in the instrument of the present invention automatically performed by mounting the optical adjusting means on spring means fastened to the support or instrument body G and arranged in such a way that during tilting of the instrument body through an angle $\alpha$ the optical means will be titlted under the influence of gravity and the resisting spring force through an angle $\beta$ to maintain the viewing direction of the instrument that is to obtain an automatic leveling.

The ratio of the angle $\beta$ to the angle $\alpha$ will depend on the optical arrangement of the telescope and from the location of the optical adjusting means in the ray path through the telescope.

Various optical elements can be used as optical means for maintaining the viewing direction of the instrument.

Figure 2:
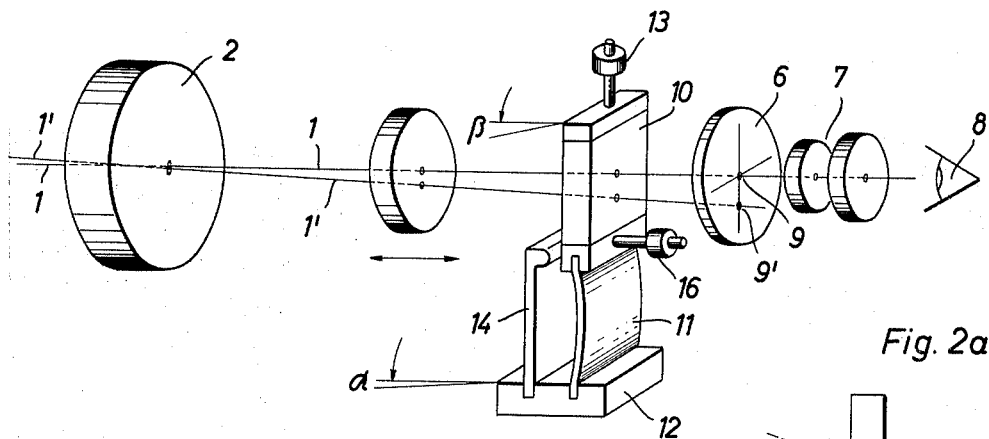
FIG. 2 is a schematic view showing another embodiment of the present invention and in this view only a portion of the instrument body is illustrated and the optical elements are shown in their proper alignment.
Figure 2A:
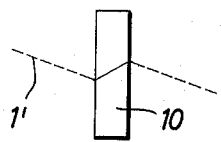
FIG. 2a is a schematic side view of the optical adjusting means shown in FIGURE 2 and illustrating the refraction of a light ray passing therethrough.

FIGURE 2 shows schematically one embodiment of the instrument according to the present invention and in this figure only a portion 12 of the instrument body G shown in FIGURE 1 on which the various optical elements are mounted is illustrated. FIGURE 2 shows again the objective 2, the adjusting lens 3, the reticle 6 and the ocular 7 formed by two lenses as schematically illustrated. The optical means for maintaining the viewing direction of the instrument are indicated between the lens 3 and the reticle 6 and the optical means for adjusting the viewing direction of the instrument are in this case in the form of a plate 10 formed from transparent material and having plano-parallel surfaces substantially normal to the optical axis of the instrument. The plate 10 is mounted on one end of a leaf spring 11 which is fixed at the bottom end thereof on the body 12 which may be a portion of the instrument body G shown in FIGURE 1 or be fixedly connected thereto. Adjusting means are provided to adjust the position of the center of gravity of the plate or optical means 10 and these adjusting means are shown in FIGURE 2 in the form of two adjusting screws 13 and 16, connected to the plate 10 and projecting therefrom normal to each other. Screw 16 is normal to the parallel surfaces of plate 10, whereas screw 13 is substantially parallel to these surfaces. Adjusting the screw 13 permits adjusting of the center of gravity of the optical means substantially in direction of the elongation of the spring 11, whereas adjustment of the screw 16 permits adjustment of the center of gravity of the optical means 10 in direction transverse thereto. The ratio of the angle $\beta$ to the angle $\alpha$ that is the ratio of the angle through which the optical means 10 is tilted to the angle through which the instrument body is tilted, necessary to obtain automatic maintenance of the viewing direction can be changed by adjusting the adjusting screw 13, while adjustment of the screw 16 produces a change in the position of the rest of the optical means 10, without substantially affecting the ratio of the angle $\beta$ to the angle $\alpha$. The adjusting screws 13 and 16 are adjusted in such a manner that the optical means 10 will tilt through an angle $\beta$ whenever the instrument body tilts through an angle $\alpha$ within the working arrangement of the instrument so as to maintain the viewing direction of the instrument. When the instrument body or the body 12 is tilted forwardly about an angle $\alpha$ the optical means 10 will tilt likewise forwardly through the angle $\beta$ and the light ray 1 will be deflected parallel and upwardly, as shown in FIGURE 2a, so that the image of a point at the same elevation as the center of objective 2 will again appear exactly at the center 9 of the reticle 6 and not at the point 9' where the point would appear when the optical means 10 would be fixedly connected to the body 12 and not be tilted through the angle $\beta$.

Figure 2B:
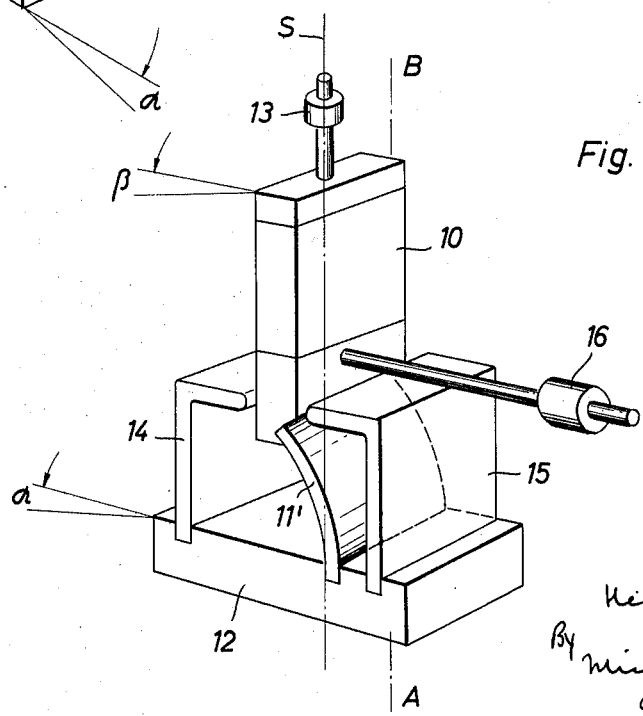
FIG. 2b is a perspective side view of an optical adjusting means according to the present invention and illustrating a slight modification of this optical element shown in FIGURE 2.

FIGURE 2b shows an optical adjusting means similar to the one shown in FIGURE 2. FIGURE 2b shows further means fixed to the support 12 for limiting the bending of the spring 11' during excessive tilting of the instrument. These means comprise two rigid members 14 and 15 respectively arranged on opposite sides of the optical element 10, and fixedly attached at the bottom end thereof to the body 12 to which the lower end of the spring 11' is connected. Members 14 and 15 have each an upper free end portion projecting substantially normal to the remainder of the respective member toward the element 10, to limit thereby the extent this member can tilt and the deflection of the spring 11'. The free ends of the members 14 and 15 are preferably spaced from the member 10 in such a manner to limit the deflection of the member 10 to 1°. The member 10 is shown in FIGURE 2b in the position of rest, that is when the instrument body is in exact horizontal position. The center of gravity of the element 10 can be again adjusted by the adjusting screws 13 and 16. As can be seen from FIGURE 2b in this position of rest the spring 11' is deflected and the center of gravity of the element 10 is adjusted in such a manner that a vertical line S passing through the center of gravity is laterally offset with respect to a vertical line A–B passing through the line of attachment of the lower end of the spring 11' to the body 12 and located as line 5 in a plane of symmetry through element 10, so that during the working range of the element 10, the spring 11' will be subjected to bending moments acting only in one direction. In other words, in this arrangement the spring is not permitted to flex in opposite direction or to pass through a position of rest the spring would assume when not stressed. In this way the spring deflection within the working range maintained by the limiting members 14 and 15 will change in a stable manner and the accuracy of the instrument will thereby be increased.

Figure 3:
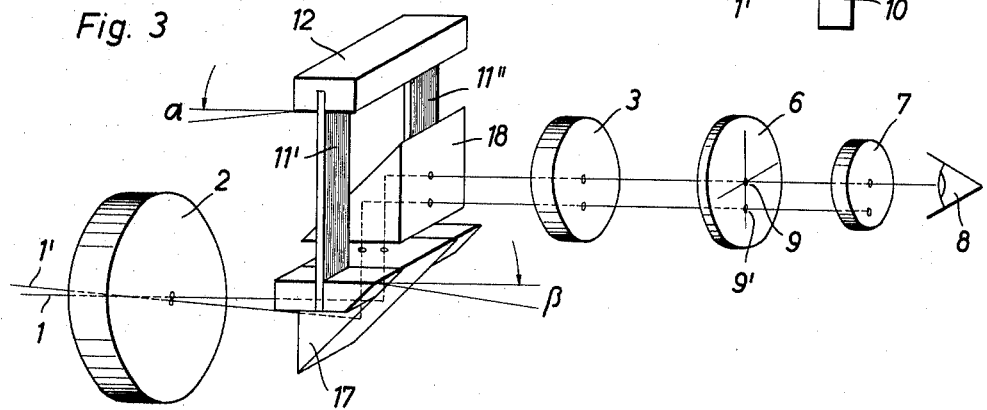
FIGURE 3 is a schematic perspective side view of another embodiment of the present invention showing the optical elements thereof while illustrating only a portion of the body of the instrument.

FIGURE 3 shows an additional embodiment of an instrument according to the present invention. In this arrangement the optical adjusting means are arranged between the objective 2 and the focusing lens 3. To the right of the focusing lens 3, as viewed in FIG. 3, reticle 6 and the ocular 7 can be seen arranged substantially in the same manner as discussed in connection with the embodiment shown in FIGURE 2. In this embodiment the optical adjusting means is shown in the form of a prism 17 carried by springs 11', 11" by being connected to the lower ends thereof, whereas the upper ends of the springs are fixed to the body 12 which may be connected to the instrument body G or form a part thereof. Cooperating with the prism 17 is a prism 18 located above the prism 17 between the spring 11' and 11" and fastened to the instrument body in any well known manner not illustrated in FIGURE 3. In the arrangement shown in FIGURE 3 the center of gravity of the prism 17 is located below the points of attachment of the springs 11' and 11" and the springs are therefore tensioned by the weight of the prism 17. During an inclination of the instrument body through the angle α the prism 17 will therefore tilt relative to the instrument body in opposite direction through an angle β. The arrangement is made again in such a way that the prism 17 will tilt during tilting of the instrument body through an angle α within the working range of the instrument through such an angle β so as to maintain the viewing direction of the instrument substantially constant as explained above.

The arrangement shown in FIGURE 3 can be modified by fixedly attaching the prism 17 to the instrument body and by carrying the prism 18 on springs similar to the springs 11' and 11" attached to the instrument body below the center of gravity of the prism 18 so that in this modification the springs would be subjected to bending and compression stresses. The position of the center of gravity of the prism 17 or the prism 18 may again be adjusted by adjusting screws 13 and 16 as shown in FIGURE 2, but for clarity sake such adjusting screws are not illustrated in FIGURE 3.

Figure 4:
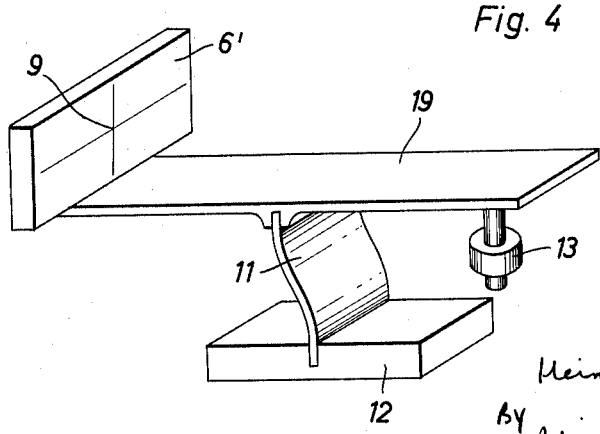
FIG. 4 is a perspective side view of another optical adjusting means according to the present invention and showing the mounting thereof.

FIGURE 4 shows another modification of optical adjusting means for an instrument according to the present invention. It is to be understood that the instrument which includes the optical adjusting means illustrated in FIGURE 4 contains otherwise the same optical element as shown in the preceding figures with the exception of the reticle 6, since the optical adjusting means illustrated in FIGURE 4 is in the form of a reticle 6'. This reticle 6' will be mounted between the lens 3 and the ocular 7 of the instrument. The reticle 6' shown in FIGURE 4 is carried at one end of the plate 19, which in turn is supported intermediate the ends thereof on the upper end of the spring 11 fixed to plate 19, whereas the lower end of the spring 11 is fixed to the body 12 which again may be part of the instrument body G shown in FIGURE 1. An adjusting screw 13 mounted on the other end of the plate 19 is used to adjust the position of the center of gravity of the unit formed by the reticle 6' and the plate 19. When the instrument body 12 is tilted through a given angle, the plate 19 with the reticle 6' mounted thereon is tilted at a corresponding angle which will in turn cause a vertical displacement of the reticle 6'. An imagery point viewed in horizontal position of the instrument at the center 9 of the reticle 6' will also be viewed when the instrument body is slightly tilted in the center point 9 of the reticle 6' and the viewing direction of the instrument will be maintained. By initially adjusting the position of the adjusting screw 13 the center of gravity of the unit formed by the reticle 6' and the plate 19 is adjusted in such a manner that the viewing direction of the instrument will be maintained during any inclination of the instrument body within the working range of the instrument.

Figure 5:
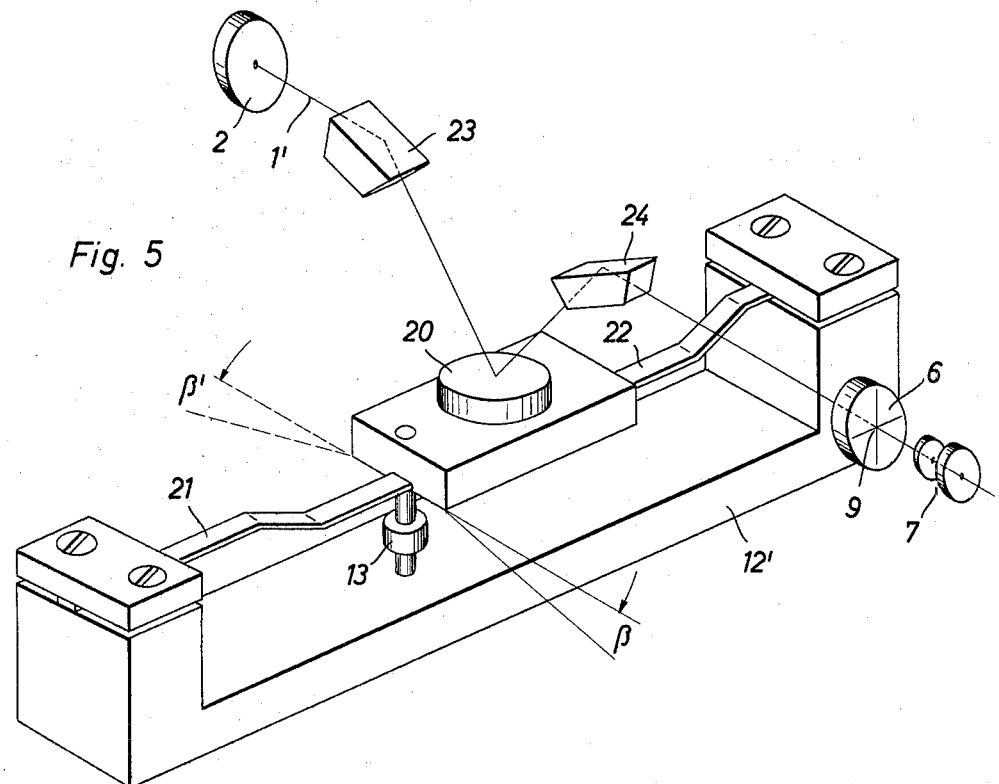
FIG. 5 is a schematic perspective side view of a further embodiment according to the present invention, likewise illustrating only a portion of the body of the instrument.

FIGURE 5 shows an additional embodiment of the instrument according to the present invention. In this embodiment a mirror is used as optical adjusting means. The mirror 20 is mounted on a plate which in turn is carried on springs 21 and 22 extending in substantially horizontal direction transverse to the optical axis of the instrument and which are fixed at the inner ends thereof to the plate carrying the mirror 20 and at the outer ends thereof to the body 12' in the manner shown in FIGURE 5 or in any other convenient manner. The body 12' may be fixed to the instrument body G shown in FIGURE 1 or may form an integral part thereof. The leveling instrument shown in FIGURE 5 includes further an objective 2, a reticle 6 and an ocular 7 mounted on the instrument body G not shown in FIGURE 5 in a manner as described in FIGURE 1. Additional optical elements 23 and 24, which may be in the form of mirrors or in the form of prisms serve to deflect the rays entering through the objective 2 onto the mirror 20 and the rays deflected by the mirror 20 through the reticle 6 and the ocular 7. An adjusting screw 13 fixed to the plate which carries the mirror serves again to adjust the position of the center of gravity of the unit formed by the mirror 20 and the plate carrying this mirror. The arrangement is made again in such a manner that during tilting of the body 12 through an angle α the plate carrying the mirror 20 and therewith the mirror 20 is tilted through a corresponding angle β in such a manner that the viewing direction of the instrument is maintained during the working range of the instrument. The springs 21 and 22 are subjected to torsional stresses during tilting of the mirror 20.

The optical adjusting means of the present invention can be adjusted and be used in such a manner that the ratio between the angle β and the angle α is between −1 and +∞. A range −1 and +10 will be sufficient in most automatic leveling instruments.

While only FIGURE 2b shows means for limiting the extent of bending of the spring and while FIGURE 2b shows a specific ararngement and adjustment of the position of the center of gravity of the optical control means in such a manner that the spring will be subjected only to bending moments in one direction, it should be noted that the same results can be obtained also with the other embodiments illustrated by providing appropriate means for limiting the deflection of the springs shown therein and by adjusting the center of gravity of the instrument accordingly.

It will be understood that each of the elements described above, or two or more together, may also find a useful application in other types of optical instruments with means for automatically maintaining the viewing direction thereof differing from the types described above.

While we have illustrated and described the invention as embodied in an optical leveling instrument with means for automatically maintaining the viewing direction thereof, we do not intend to be limited to the details shown, since various modifications and srtuctural changes may be made without departing in any way from the spirit of our invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An optical leveling instrument comprising, in combination, support means having a horizontal reference position and tiltable in a vertical plane from said horizontal reference position to opposite sides within a predetermined limited tilting range; a pair of optically aligned lens means mounted spaced from each other on said support means and defining an optical axis located in said vertical plane; upwardly extending elongated supporting spring means fastened at the lower end thereof to said support means and having an upper end; and optical means mounted on and carried by said upper end of said upwardly extending elongated supporting spring means, located between said lens means and constructed so as to variably deflect the viewing direction of said instrument depending on the position of said optical means relative to said lens means, said optical means and said upwardly extending elongated supporting spring means being mounted and dimensioned so that in said horizontal reference position of said support means said upwardly extending elongated supporting spring means is bent in said vertical plane containing said optical axis of said pair of lens means by the weight of said optical means from an initial unstressed position to one side into an operative stressed position thereof to such an extent that during tilting of said support means within said predetermined limited tilting range thereof said elongated supporting spring means always stays on one side of said initial unstressed position and said optical means retains the viewing direction of said instrument substantially unchanged despite tilting of said support means within said predetermined limited tilting range thereof.

2. An optical leveling instrument, as set forth in claim 1, and including limiting means fixed to said support means for limiting the extent of bending of said spring means during excessive tilting of said support means.

3. An optical instrument as set forth in claim 1, and including adjusting means comprising a pair of adjustable screws fixed to and projecting normal to each other from said optical means substantially in said vertical plane for adjusting the position of the center of gravity of said optical means.

4. An optical leveling instrument as set forth in claim 1, wherein said optical means comprises a plate formed from transparent material and having two plano-parallel faces extending substantially normal to said optical axis.

5. An optical leveling instrument as set forth in claim 1, wherein said optical means comprises a first prism cooperating with a second prism fixed on said support means.

References Cited by the Examiner

UNITED STATES PATENTS

| | | | |
|---|---|---|---|
| 2,089,745 | 8/1937 | Graf. | |
| 2,141,628 | 12/1938 | Bornemisza. | |
| 2,598,552 | 5/1952 | Jansen. | |
| 2,779,231 | 1/1957 | Drodofsky | 88—1 X |
| 2,907,246 | 10/1959 | Farrand et al. | 88—1 |
| 2,933,814 | 4/1960 | Thompson | 88—1 X |
| 2,938,422 | 5/1960 | Hardy | 88—1 |
| 2,944,783 | 7/1960 | Macliesh et al. | 88—1 X |
| 2,959,088 | 11/1960 | Rantsch | 88—1 |
| 2,997,912 | 8/1961 | Mikic | 88—1 |

FOREIGN PATENTS

| | | |
|---|---|---|
| 531,233 | 7/1955 | Italy. |
| 585,002 | 11/1958 | Italy. |

OTHER REFERENCES

Ertel: German application 1,040,270, printed Oct. 2, 1958.

DAVID H. RUBIN, *Primary Examiner.*